United States Patent [19]
Meinerth et al.

[11] Patent Number: 6,025,855
[45] Date of Patent: Feb. 15, 2000

[54] STORE DOUBLE WORD AND STATUS WORD WRITE GRAPHICS PRIMITIVES

[75] Inventors: Kim A. Meinerth, Granite Bay; Aditya Sreenivas, El Dorado Hills; Krishnan Sreenivas, Rancho Cordova, all of Calif.

[73] Assignee: Intel Corporation, Santa Clara, Calif.

[21] Appl. No.: 09/021,231

[22] Filed: Feb. 10, 1998

[51] Int. Cl.[7] .................................................. G06F 12/00
[52] U.S. Cl. ...................... 345/514; 345/513; 345/522; 345/515
[58] Field of Search .................................... 345/501, 507, 345/509, 513–516, 522; 395/681, 682

[56] References Cited

U.S. PATENT DOCUMENTS

| | | | |
|---|---|---|---|
| 4,598,384 | 7/1986 | Shaw et al. | 345/116 |
| 5,440,746 | 8/1995 | Lentz | 345/504 |
| 5,481,276 | 1/1996 | Dickey et al. | 345/132 |
| 5,745,761 | 4/1998 | Celi, Jr. et al. | 395/681 |

*Primary Examiner*—Kee M. Tung
*Attorney, Agent, or Firm*—Blakely, Sokoloff, Taylor & Zafman LLP

[57] ABSTRACT

A method for communicating graphics device status information to a graphics driver. Status of a graphics device is checked to determine whether the graphics device is ready to process a next instruction. A location in cacheable memory accessible to a graphics driver is updated with the status. The graphics driver reads the status to determine when to generate the next instruction for processing by the graphics data. A first instruction to be forwarded to the graphics device is generated. A status in an operating register in the graphics device is updated indicating that an event is being monitored. The updating is performed in response to receipt of the first instruction by the graphics device. The status is written to a second cacheable location in system memory accessible to the graphics driver. A second instruction is generated by the graphics driver to provide a predetermined address and instruction completion data to the graphics device.

12 Claims, 7 Drawing Sheets

STORE DOUBLE WORD AND STATUS WORD WRITE GRAPHICS PRIMITIVES

BACKGROUND OF THE INVENTION

(1) Field of the Invention

The field of the invention is in graphics data processing for computer systems; more specifically, the present invention is related to a method and apparatus for status communication between a graphics device for processing graphics data for display and its graphics drivers.

(2) Related Art

Presently available computer systems are typically equipped with a graphics device capable of processing graphics data for display on a display device. Graphics drivers of a graphics device typically generate instructions and data for the graphics device to process a next frame for display on a display device. The timing of generation as well as the type of instruction and data to be generated by a graphics driver for the graphics device to process is dependent on the graphics device processing status.

Currently, graphics device processing status is provided to the graphics driver through a processor which is required to access internal registers of the graphics device for the status information. This approach typically involves the processor sending a request and initiating numerous read operations to the graphics device requiring both the processor as well as bus time. The prior art therefore takes bus processing time away from other devices and processor time away from other applications.

A method and apparatus is therefore desired which obviate the need for the processor to perform reads to internal registers of a graphics device while still providing the graphics device status information to the graphics drivers.

BRIEF SUMMARY OF THE INVENTION

An apparatus has a computer readable medium having at least one graphics driver. The execution of the graphics driver is configured to generate instructions for checking status of a graphics device which is coupled to a system memory. Further, the graphics device is configured to forwarding a graphics device status to the system memory for access by the graphics driver in response to the instructions.

DETAILED DESCRIPTION OF THE INVENTION

The present invention is an efficient method and apparatus for communication between a graphics device and a graphics driver. The present invention provides a graphics device status to a cacheable location in system memory for easy access by a graphics driver and obviates the need for a processor to access internal operating registers of the graphics device.

Figure 1:
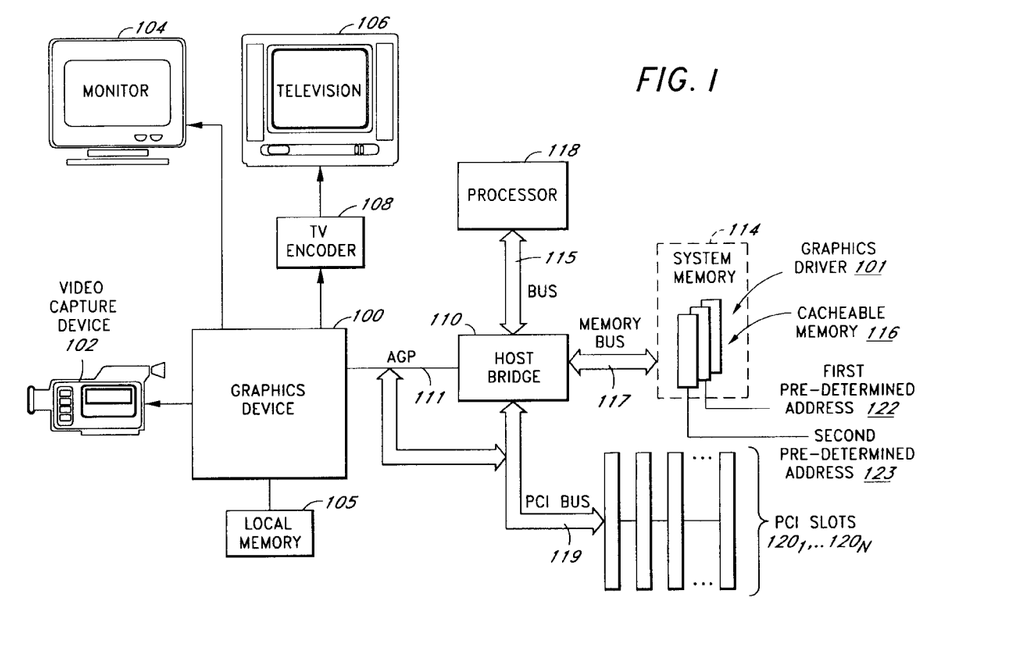
FIG. 1 is a system block diagram illustrating the present invention's graphics device.

FIG. 1 is a system block diagram illustrating the present invention's graphics device. The present invention's graphics device 100 is capable of accessing system memory 114 with cacheable memory 116 through host bridge 110.

The host bridge 110 allows various devices including the graphics device 100, the processor 118 and the peripheral component interconnect (PCI) devices $120_1 \ldots 120_N$ to retrieve and forward data to and from the system memory 114.

In one embodiment, the PCI devices $120_1 \ldots 120_N$ are input/output hardware devices that are connected to the system through, for example, a PCI expansion connector (not shown). Examples of PCI devices include but are not limited to a graphics controller/card, a disk controller/card, a local area network (LAN) controller/card and a video controller/card.

An accelerated graphics port (AGP) 111 is a point to point connection between the graphics device 100 and the host bridge 110. In one embodiment, the AGP 111 is designed to optimize the graphics data transfer operations in high speed personal computers (PC).

The processor 118 is coupled to the host bridge 110 through a bus 115. The system memory 114 is coupled to the host bridge 110 through a bus 117. The PCI devices $120_1 \ldots 120_N$ are coupled to the host bridge 110 through a bus 119. The processor 118 may be a Pentium® II processor.

At least one graphics driver 101 generates graphics instructions, graphics data and starting addresses of graphics data for use by the graphics device 100. Once generated, the graphics instructions and graphics data are forwarded to the AGP 111 for storage in the graphics device 100's local memory 105. The start address is forwarded to the PCI devices $120_1 \ldots 120_N$ for storage in a cacheable memory 116 in the system memory 114. The cacheable memory 116 has a first predetermined address 122 and a second predetermined address 123 for storing graphics device 100's status information accessible by the graphics driver 101.

Figure 2:
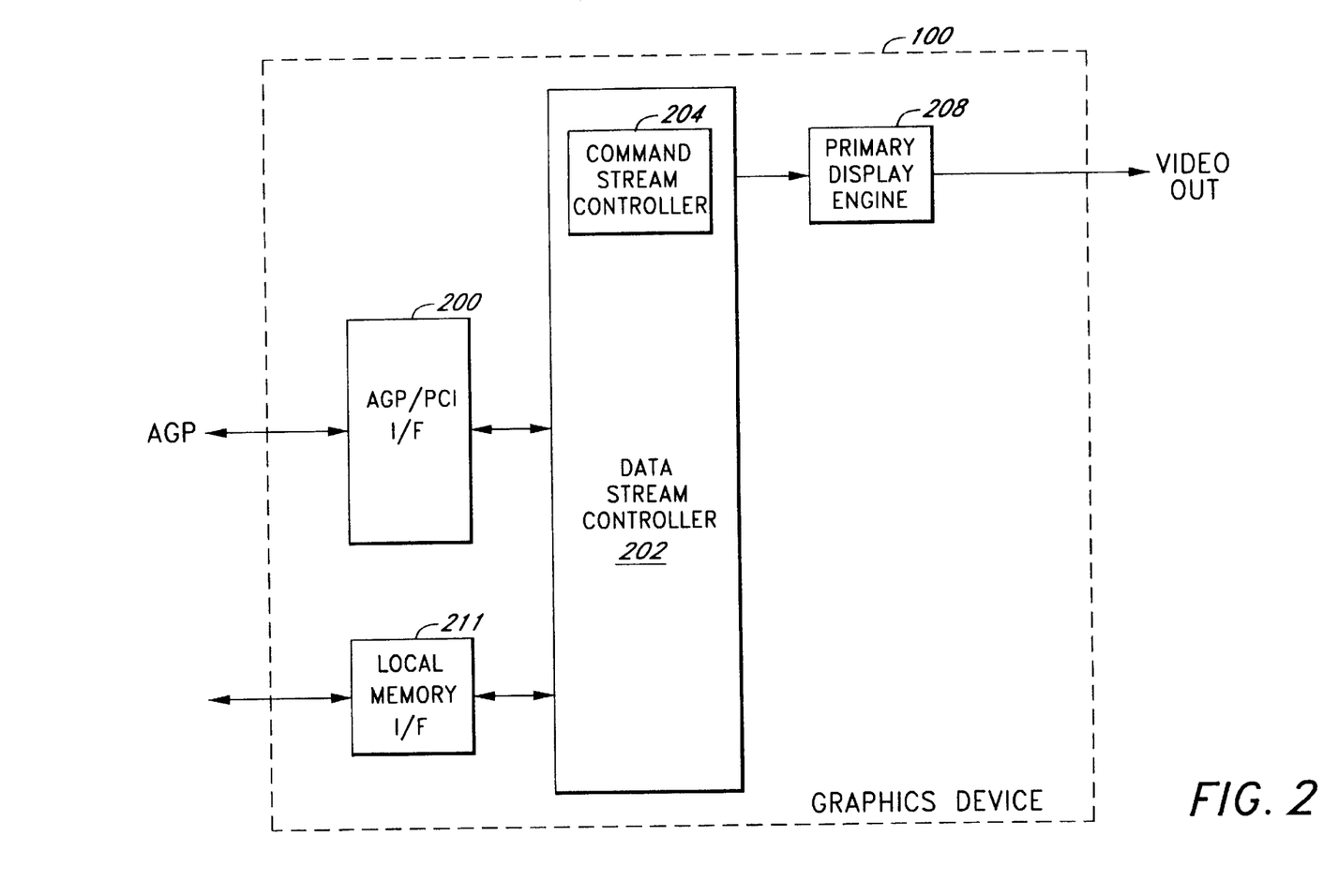
FIG. 2 is one embodiment of the process flow of the graphics device.

FIG. 2 is a block diagram of the graphics device of the present invention. Graphics drivers of a graphics device typically generate instructions and data for the graphics device to process. The graphics device processes the instruction and data to generate graphics data for display on a display device through a primary display engine 208. The timing of the generation as well as the type of instruction and data to be generated by a graphics driver for the graphics device to process is dependent on the graphics device's processing status.

With the present invention, the graphics device 100's status information is provided to the graphics driver 101 in a cacheable location 116 in system memory 114. Graphics device status information provided to the graphics driver 101 includes but is not limited to information on when a particular graphics instruction generated by the graphics driver 101 has been processed by the graphics device 100 and when a particular event has occurred during graphics data processing by the graphics device 100.

For example, the graphics driver 101 may generate a graphics instruction for forwarding to the graphics device 100 and take no further action until the graphics device 100 has processed the graphics instruction. In order to have the graphics device 100 report its processing status to a cacheable location 116 in system memory 114, the graphics driver 101 also generates and forwards a store double word instruction to follow the graphics instruction for processing by the graphics device 100. The graphics driver 101 then begins polling a first predetermined address 122 in cacheable memory 116. The first predetermined address 122 is one of the locations to which the graphics device 100 reports its processing status.

While the graphics driver 101 is polling the first predetermined address 122, the graphics instruction and the store double word instruction are forwarded to the graphics device 100 through the host bridge 110. In the graphics device 100, the instructions are forwarded to a data stream controller 202 through an AGP/PCI interface block 200. The AGP/PCI interface block 200 facilitates the transmission of data between the data stream controller 202 and the AGP and the PCI bus.

The data stream controller 202 controls the flow and the processing of various data entering and leaving the graphics device 100. In one embodiment, the data stream controller 202 may have a plurality of data stream controllers, at least one for each different type of data. In the embodiment of the present invention, the data stream controller 202 has at least a command stream controller 204 for processing various instructions received by the graphics device 100.

More specifically, the command stream controller 204 decodes graphics instructions received by the graphics device 100 from the processor 118, as well as from applications in system memory 114 and/or the PCI devices $120_1 \ldots 120_N$ and has a plurality of operating registers (not shown) capable of holding status information indicating, for example, the processing status of various graphics instructions. The two instructions are processed by the command stream controller 204.

The store double word instruction causes the command stream controller 204 to perform a PCI write to the first predetermined address 122 in cacheable memory 116 indicating that the store double word instruction has been processed by the graphics device 100. The completed processing of the store double word instruction also indicates that the graphics instruction which was forwarded to the graphics device prior to the store double word instruction has been processed by the graphics device 100. While polling the first predetermined address 122, the graphics driver 101 determines that the graphics instruction has been processed by the graphics instruction when the contents of the first predetermined address 122 is changed.

In a similar manner, the occurrence of certain events during graphics device processing causes corresponding status bits in an interrupt status register (not shown) of the command stream controller 204 to be modified. Examples of such events include but are not limited to occurrences of a display flip or a vertical blank during graphics device processing. The graphics driver must be notified of the occurrences of these events in order to timely generate a next graphics instruction and/or data to be forwarded to the graphics device for processing. Thus, along with status information on the completed processing of a graphics instruction, the present invention also causes status information on occurrences of certain graphics events to be written to the cacheable memory 116 for access by the graphics driver 101. For example, the graphics driver 101 may poll a second predetermined address 123 in cacheable memory 116 for status information on occurrences of certain graphics events such as a display flip or a vertical blank. Once the event occurs, the status information is written to a second predetermined address 123 in cacheable memory 116 for access by the graphics driver 101.

In this way, the graphics driver 101 is provided with the status on when a particular graphics instruction it has generated has been processed by the graphics device 100 as well as when a particular event has occurred during graphics device processing.

Figure 3:
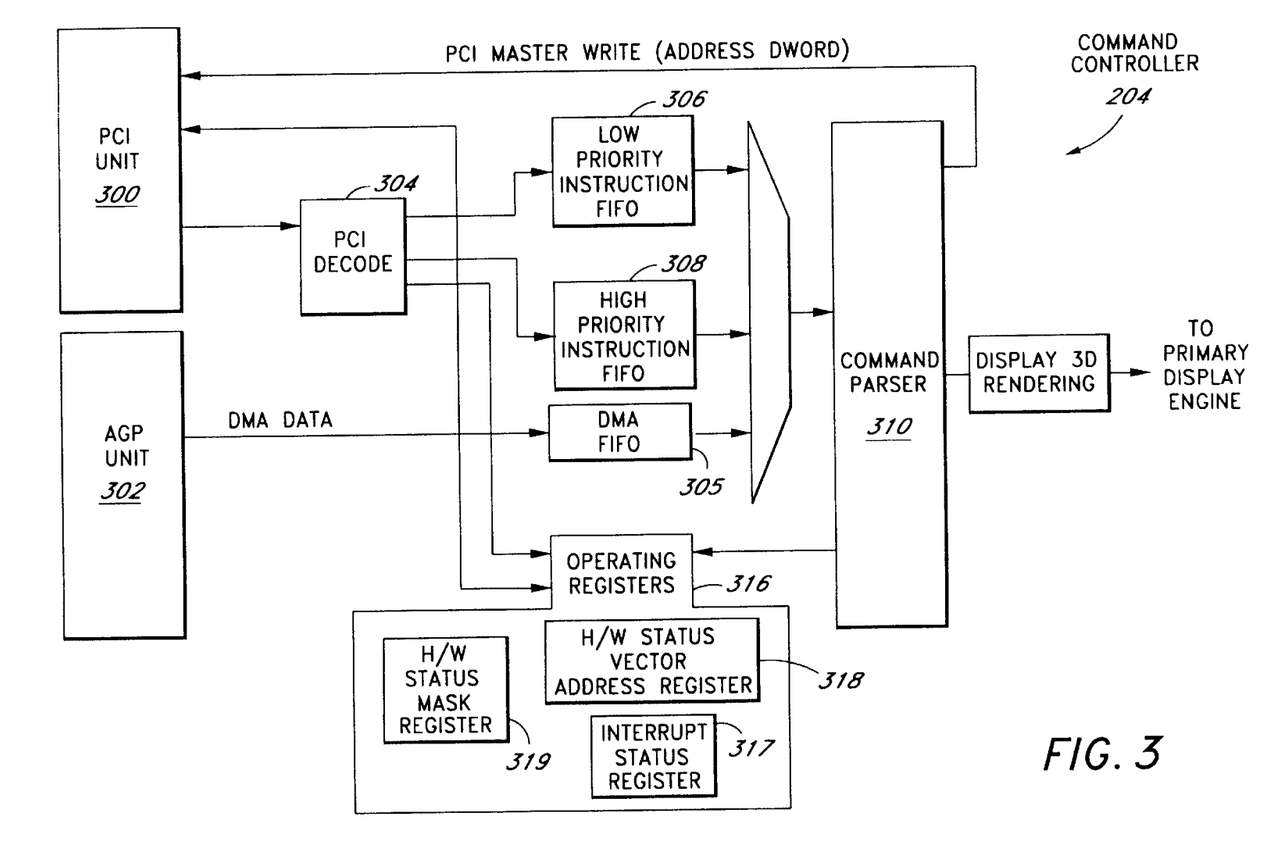
FIG. 3 illustrates a command stream controller of the graphics device.

FIG. 3 illustrates an exemplary command stream controller of the present invention. The process by which status information is provided to the graphics driver 101 as referenced in the description accompanying FIG. 2 is described here in more detail.

If a graphics driver 101 needs a status information indicative of the completed processing of a graphics instruction, the graphics driver 101 generates a store double word instruction after it generates the graphics instruction. Once generated by the graphics driver 101, the graphics instruction is first forwarded to the command stream controller 204 of the graphics device 100. The store double word instruction is generated after the graphics instruction and forwarded to the command stream controller 204. The graphics driver 101 then begins to poll the first predetermined address 122 in cacheable memory 116.

If the instructions are received by the command stream controller 204 through the PCI unit 300, the instructions are decoded by a PCI decoder 304 and transmitted to either a low priority instruction first-in first-out (FIFO) 306 or a high priority instruction FIFO 308 depending upon the priority of the instruction being processed. Priority is predetermined by the system designers of the particular computer system being designed. If the instructions are received through an AGP unit 302 of the command stream controller, the instructions are sent to a direct memory access (DMA) FIFO 309.

The first instruction transmitted for processing is the graphics instruction which status needs to be communicated to the graphics driver 101. The graphics instruction is parsed through a command parser 310. The graphics instruction also causes an interrupt status register 317 to be updated in an operating register block 316. More specifically, the graphics instruction causes the command parser to generate a bit change operation which changes a status bit in an interrupt status register 317 from a 0 to a 1 indicating that a particular event is being monitored.

The other registers in the graphics device of significance are a hardware status mask register 319 and a hardware status vector address register 318, both in the internal operating registers 316 of the command stream controller 204. The hardware status mask register 319 enables or disables masking of a signal from the interrupt status register 317 in response to a status bit change. A store double word is only reported to the cacheable memory 116 if the signal is not masked. The hardware vector address register 318 contains the cacheable address where the contents of the interrupt status register 317 are reported. As previously mentioned, any change in any of the bits in the interrupt status register 317 results in the status being reported to the cacheable memory 116 if the corresponding bit is not masked off in the hardware status mask register 319.

In one embodiment, the hardware status mask register 319 is a sixteen bit read/write register located in the internal operating register block 316 of the command stream controller 204 of the graphics device 100. For a change in bit 0 of the interrupt status register 317 to be reported to the cacheable memory 116 in system memory 114, bit 0 of the hardware status mask register 319 should also be set to a "0" to allow the forwarding of the interrupt status bit without masking. When there is a change in the interrupt status register 317 which is not masked by the hardware status mask register 319, the unmasked interrupt signal causes an interrupt request to be generated which in turn causes a write to the cacheable memory 116 of the system memory 114.

After the interrupt status register 317 is updated, the command parser 310 performs a PCI master write 312 of the status bit to a second predetermined address 123 in cacheable memory 116 of 1 indicating that a particular event is being monitored. The second predetermined address 123 is designated by the hardware status vector address register 318 of the operating registers 316.

The store double word instruction generated by the graphics driver 101 is also forwarded to the command parser 310 of the command controller following the graphics instruction. The store double word instruction causes the command parser 310 to generate another PCI master write 312 of an instruction completion indicator data to a first predetermined address 122 in the cacheable memory 116. The first predetermined address 122 and the instruction completion indicator data are provided by the store double word instruction.

Upon receiving the instruction completion indicator data through the PCI master write 312, the PCI unit 300 writes the instruction completion indicator data to the first predetermined address 122 in the cacheable memory 116. Once the instruction completion indicator data has been written to the first predetermined address 122, the graphics driver 101 which has been polling the first predetermined address 122 finds the instruction completion indicator data and is therefore notified that both the graphics instruction and the store double word instruction have been processed by the graphics device 100.

The graphics driver 101 then begins to poll the second predetermined address 123 in the cacheable memory 116 until it finds the status bit in the second predetermined address 123 changed from a 1 indicating that a particular event is being monitored to a 0 indicating that the monitored event has occurred.

While the graphics driver 101 is polling the second predetermined address 123, the occurrence of the monitored event causes the command parser 310 to generate a bit change operation which changes a status bit in the interrupt status register 317 from a 1 to a 0 indicating that the monitored event has occurred.

The status change in the interrupt status register 317 causes the command parser 310 to perform a PCI master write 312 to the second predetermined address 123 in cacheable memory 116 which changes the status bit in the second predetermined address 123 from a 1 to a 0 indicating that the monitored event has occurred. The graphics driver 101 which has been polling the second predetermined address 123 in cacheable memory 116 finds that the status bit has changed from a 1 to a 0 indicating that the monitored event has occurred. The graphics driver 101 which has been waiting on the event to occur may now initiate further action. The graphics driver 101 continues by generating a new graphics instruction followed by a new store double word instruction and the process repeats.

Figure 4A:
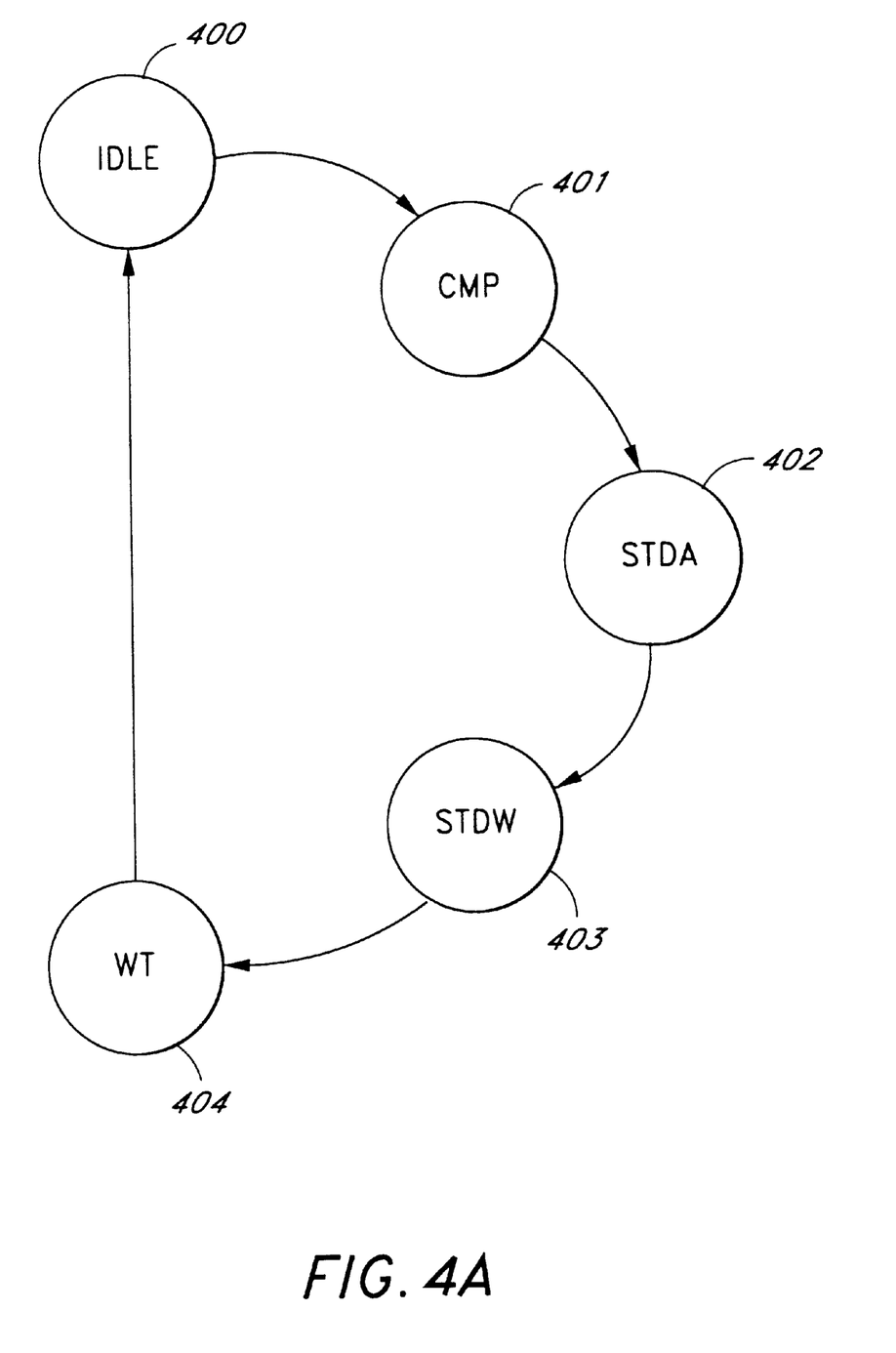
FIG. 4a and 4b are state machines illustrating one embodiment of the present invention's store double word instruction.

FIG. 4a is a state transition diagram illustrating one embodiment of the process flow of the command parser in processing the store double word instruction of the present invention. More specifically, the state transitions in FIG. 4a are illustrative of the sequence of events which occur in the command parser 310 on receipt of the store double word instruction by the command parser 310.

In the idle state 400, the command parser 310 responds to any valid instruction which it receives. Every instruction consists of one or more double words, and the store double word instruction consists of three words.

The first double word in an instruction contains information regarding the client, index and the target to which the data is to be forwarded. The client field determines the type of instruction the graphics device is receiving. In one embodiment of the present invention, the client value of 0 indicates that a rendering packet (a three-dimensional (3-D) instruction packet) is to be forwarded down to the graphics device 100 to be used in performing three-dimensional operations to a next frame to be displayed. The client value of 1 indicates that the value is a state variable information and a client value of 2 signifies that the value is a palette/stipple instruction which is a color/graphics instruction. A client value of 3 signifies that it is a blitter operation which typically involves a movement of a bit map image on a screen, and a client value of 4 indicates that the value is a command packet. Finally, a client value of 5 signifies that the value is a no-operation (i.e. do nothing). In one embodiment, the store double word instruction falls in the category where the client value is a 4 (i.e., a command packet).

When the command parser 310 sees the value of 4 in the client value field of the instruction received, the command parser state transitions from the idle state 400 to the command parser (cmp) 401 state, at which point the command parser 310 begins differentiating between the various instructions in the command packet category. In this state, the command parser 310 looks at the target field of the given instruction to determine the instruction which it needs to execute next.

Once the command parser 310 determines the instruction that it needs to execute by looking at the target field of the instruction received, the command parser 310 transitions to the store double word (stda) state 402 if the index field is 0 and only if the command stream controller 204 is not attempting to post a store double word (i.e. write status information to the graphics device 100). Otherwise, if the command stream controller 204 is attempting to post a store double word to the PCI interface 300 in the graphics device 100, and is waiting on the acceptance from the PCI interface 300, then the command parser 310 waits in the command parser 401 state.

In the stda state 402, the command parser 310 waits to receive the address information from the AGP/PCI interface 200, stores the address in the hardware status vector address register 318, and transitions to the store double word (stdw) state 403. In state 403, the command parser 310 waits for data from the AGP/PCI interface 200, makes a request for a PCI write and transitions to a wait state 404. From the wait state 404, the command parser 310 transitions back to the idle state 400.

Figure 4B:
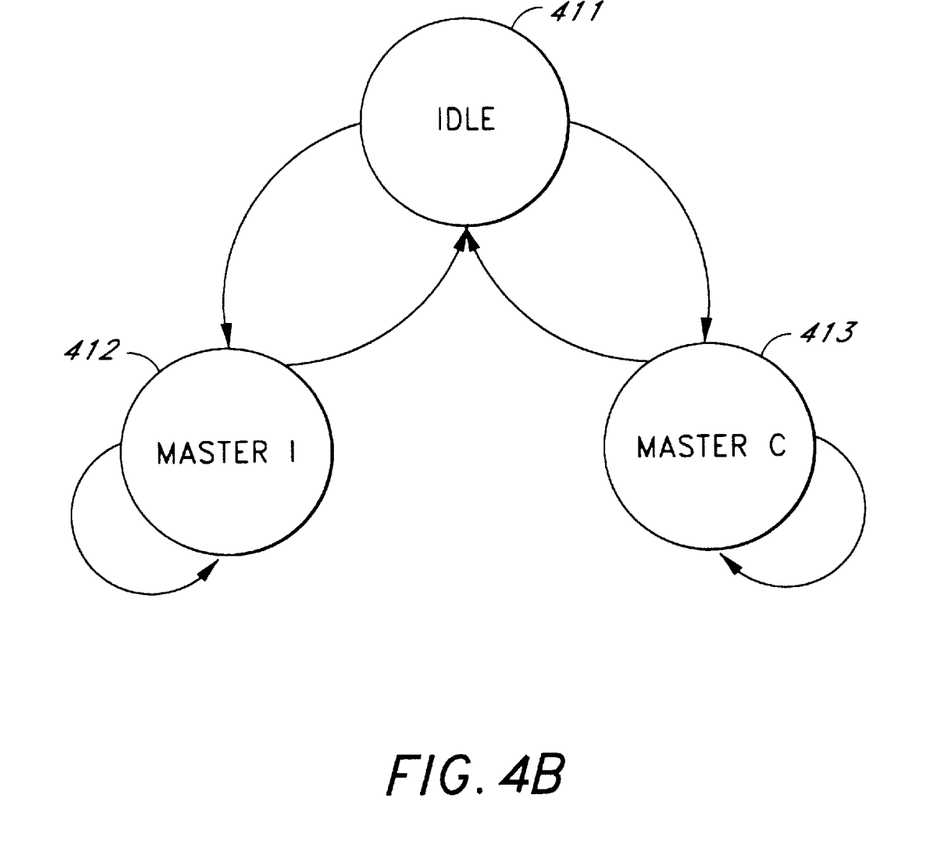

FIG. 4b is a state machine illustrating one embodiment of the process flow followed in communicating status information to a cacheable memory using the present invention's store double word instruction. The state machine has two portions. Namely, the transition between state 411 and state 412 represents state changes caused by a graphics instruction being monitored and the transition between state 411 and state 413 represents state changes caused by the store double word instruction.

In response to the graphics instruction being received by the command parser 310, the state machine transitions from an idle state 411 to a master interrupt (Master I) state 412. The graphics instruction causes the command parser 310 to generate a bit change operation which changes a corresponding graphics device status bit from a 0 to a 1 in the interrupt status register 317 indicating that an event is being monitored and its occurrence is pending. The graphics instruction also causes the command parser 310 to generate a PCI master write to a second predetermined address 123 in cacheable memory 116. The second predetermined address 123 is provided by a hardware status vector address register 318. The status bit in the second predetermined address 123 is changed from a 0 to a 1 indicating that an event is being monitored and its occurrence is pending. The state machine returns to an idle state 411.

While the master write of the graphics instruction is pending, a store double word instruction generated by the graphics driver 101 transitions the other half of the state machine from an idle state 411 to a master write (Master C) state 413. The store double word instruction causes a second PCI master write to be performed. The state machine waits in this state until the write operation occurs. The second PCI master write writes an instruction completion indicator data in a first predetermined address 122 in cacheable memory to indicate that the graphics instruction has been processed. The first predetermined address 122 and the instruction completion indicator data is provided by the store double word instruction.

Once the store double word instruction has completed its PCI master write, the state transitions from a master write (Master C) state 413 back to an idle state 411. The graphics driver 101 then begins polling the second predetermined address 122 in cacheable memory 116 until the status bit changes from a 1 to a 0 indicating that the monitored event has occurred.

The occurrence of the monitored event causes the command parser 310 to generate a bit change operation. The bit change operation causes the status bit in the interrupt status register 317 to change from a 1 to a 0 indicating that the monitored event has occurred.

Upon the interrupt request caused by an unmasked interrupt signal generated by the interrupt status register 317, a transition to the master interrupt (Master I) state 412 is made and a PCI write to the cacheable memory 116 is initiated. Once the PCI interface 200 acknowledges the PCI write generated by the interrupt request, the PCI interface 200 acts as an exit path out of the graphics device 100 to the cacheable memory 116. The command parser 310 generates a PCI master write of the new status bit to the second predetermined address 123 in the cacheable memory 116 and the state transitions from an idle state 411 to a master write (Master C) state 413. The PCI unit acknowledges the PCI master write and the state machine returns to the idle state 411 when the write of the new status bit to the second predetermined address 123 in the cacheable memory 116 completes.

The graphics driver 101 finds that the graphics device status bit in the second predetermined address 123 in cacheable memory 116 has changed from 1 to a 0 indicating that the monitored event has occurred. The graphics driver 101 may then generate further instructions and data in response and the entire process repeats.

Figure 5A:
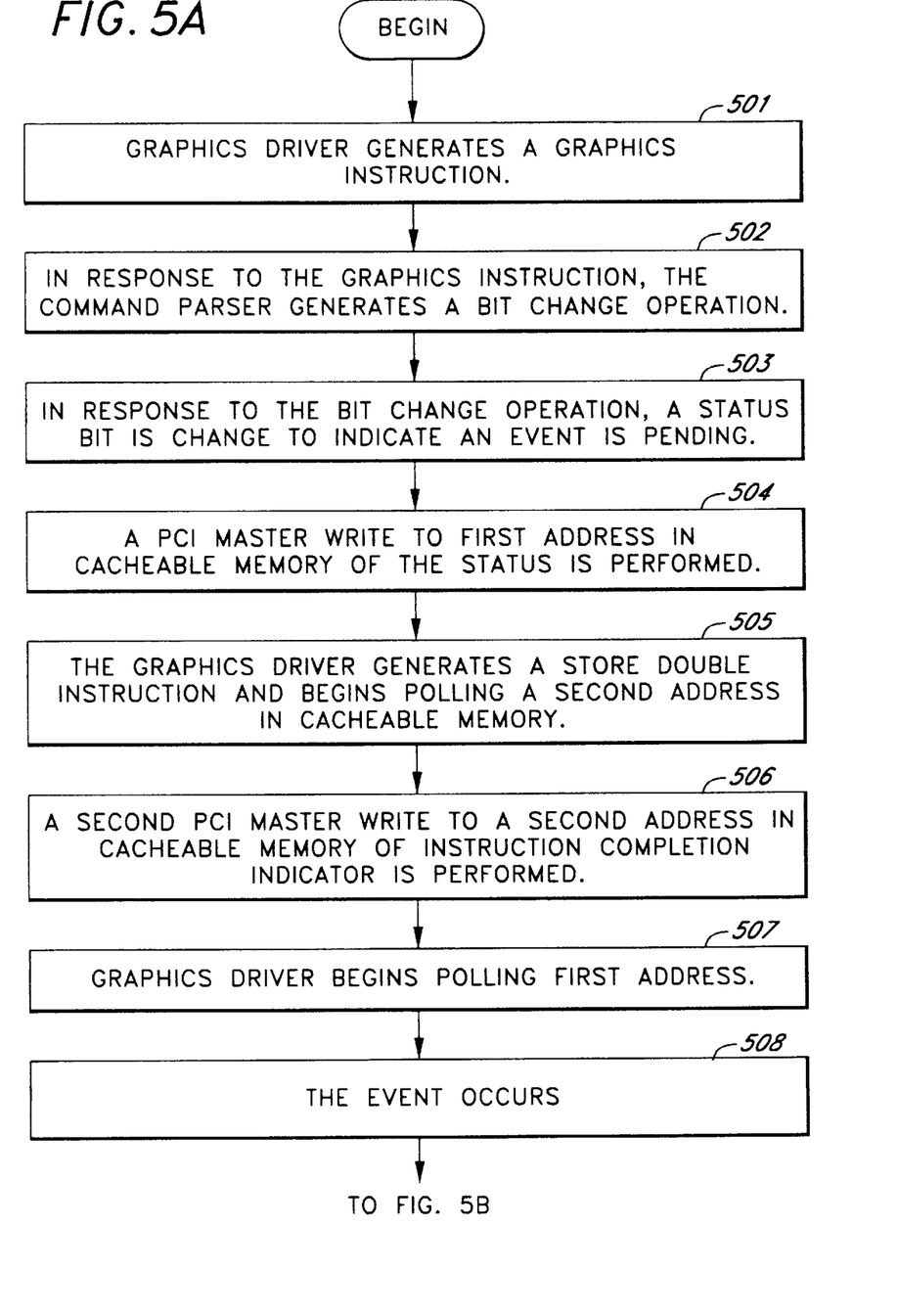
FIG. 5a and 5b are flow diagrams illustrating the general steps followed by one embodiment of the present invention.
Figure 5B:
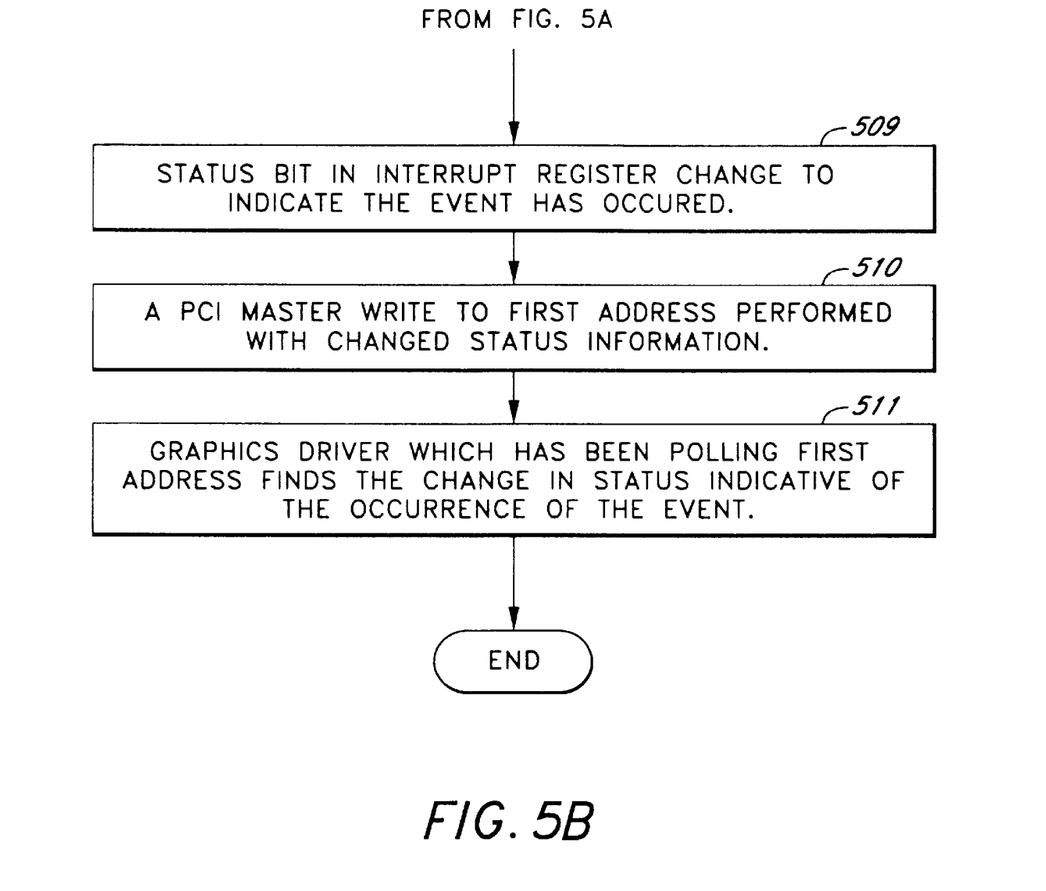

FIGS. 5a and 5b are flow diagrams illustrating the general steps followed by the present invention. In step 501, a graphics driver 101 for the graphics device 100 generates a graphics instruction in preparation for the next frame data to be processed by the graphics device 100 and initializes a first predetermined address 122 in cacheable memory 116. The graphics instruction is provided to the graphics device 100 through its AGP/PCI interface and transmitted to the command parser 310 of the graphics device 100.

In step 502, in response to the graphics instruction, the command parser 310 generates a bit change operation in the operating register 316. In step 503, in response to the bit change operation, the status bit of the interrupt status register 317 in the operating register 316 is changed from a 0 to a 1 indicating that the occurrence of an event is being monitored.

In step 504, in response to the change in the status bit of the interrupt status register 317, the operating register 316 generates a PCI master write signal which enables a PCI write to a second predetermined address 123 in cacheable memory 116 provided by a hardware status vector address register 318 also resident in the operating register 316.

In step 505, a store double word instruction is generated by the graphics driver 101 to the graphics device 100 through the AGP/PCI interface 200 and is forwarded to the command parser 310 of the graphics device 100. In step 506, in response to the store double word instruction, the command parser 310 generates a second PCI master write which is to a first predetermined address 122 in cacheable memory 116 for an instruction completion indicator data to notify the graphics driver 101 that the graphics instruction has been processed by the graphics device 100.

In step 507, once the store double word instruction has completed its write operation, the graphics driver 101 begins polling the second predetermined address 123 specified by the hardware status vector address register 318 to determine whether the second predetermined address 123 in cacheable memory 116 contains a status bit of 0 indicating that the monitored event has occurred.

In step 508, the monitored event occurs. In step 509, the event occurring causes the status bit in the interrupt status register 317 to change from a 1 to a 0 indicating that the monitored event has occurred. In step 510, the change in the status bit in the interrupt status register 317 causes a PCI master write of the status bit in the second predetermined address 123 in cacheable memory 116 from a 1 to a 0 indicating that the monitored event has occurred.

In step 511, the graphics driver 101 finds that the status bit in the second predetermined address 123 in memory is a 0 indicating that the monitored event has occurred. The graphics driver 101 then generates a new graphics instruction and the process repeats.

What has been described is a method and apparatus for efficiently notifying a graphics driver when a graphics instruction has been processed by the graphics device and when a monitored event in the graphics device has occurred. The present invention overcomes the disadvantages of the prior art approach by having the graphics device report its status to cacheable memory. The present invention obviates the need for a processor to read internal operating registers of the graphics device to determine status. Instead, the graphics driver only needs to poll cacheable locations in system memory for the status of a graphics device processing.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed:

1. A method for communicating graphics device status information to a graphics driver comprising the steps of:

checking status of a graphics device to determine whether said graphics device is ready to process a next instruction;

updating a location in cacheable memory accessible to a graphics driver, said location being updated with said status, said status to be read by said graphics driver to determine when to generate said next instruction for processing by said graphics data;

generating a first instruction to be forwarded to said graphics device;

updating a status in an operating register in said graphics device indicating that an event is being monitored, said updating being performed in response to receipt of said first instruction by said graphics device;

performing a first write of said status to a second cacheable location in system memory accessible to said graphics driver; and generating a second instruction providing a predetermined address and instruction completion data to said graphics device, said generating being performed by said graphics driver.

2. The method of claim 1 further comprising performing a second write to a first cacheable location in system memory accessible to said graphics driver.

3. The method of claim 2 further comprising polling said first cacheable location in system memory until said second write completes writing said instruction completion data to said first cacheable location, completion of said second write indicating to said graphics driver that both said first and said second instructions have been processed by said graphics device.

4. The method of claim 3 further comprising polling said second cacheable location in system memory, said polling performed by said graphics driver.

5. The method of claim 4 further comprising generating a third write to update the status in said second cacheable location in system memory when said event has occurred.

6. The method of claim 5 further comprising generating said next instruction for processing by said graphics devices.

7. An apparatus for communicating graphic device status information to a graphics driver comprising:

a computer readable medium having at least one graphics driver, execution of said graphics driver configured to generate instructions for checking status of a graphics device to determine whether said graphics device is ready to process a next instruction, said graphics device coupled to a system memory, said graphics device configured to forward a status to said system memory for access by said graphics driver in response to said instructions, said instructions comprises a first instruction configured to provide said graphics device with a graphics data and updating a second predetermined address in said memory accessible to said graphics driver with said status, said status to be read by said graphics driver to determine when to initiate delivery of said next instruction to said graphics device; and a command stream controller configured to process said instructions and having an operating register residing in said graphics device to which said first instruction causes said status to be updated indicating that a graphics device event is pending.

8. The apparatus of claim 7 wherein said instructions further comprises a second instruction configured to cause said graphics device to write an instruction completion data to a first predetermined address in said memory, said instruction completion data causing said graphics driver to begin polling said second predetermined address in said memory for said status.

9. The apparatus of claim 8 wherein said graphics driver polling said second predetermined address finds said updated status indicating that said event has occurred and begins processing said next instruction for delivery to said graphics device.

10. A system for communicating status information to a graphics driver comprising:

a computer readable medium having a graphics driver, execution of said graphics driver configured to generate instructions for checking status of a graphics device to determine whether said graphics device is ready to process a next instruction, said graphics device coupled to a system memory, said graphics device configured to forward said status to said system memory for access by said graphics driver in response to said instructions, said instructions comprising a first instruction configured to update a second predetermined address in said memory accessible to said graphics driver with said status, and said status to be read by said graphics driver to determine when to initiate delivery of a next instruction to said graphics device;

a command stream controller configured to process said instructions and having an operating register residing in said graphics device to which said first instruction causes said status to be updated indicating that a graphics device event is pending; and a processor coupled to said computer readable medium, said processor configured to perform said execution of said graphics driver.

11. The system of claim 10 wherein said instructions further comprises a second instruction configured to cause said graphics device to write an instruction completion data to a first predetermined address in said memory, said instruction completion data causing said graphics driver to begin polling said second predetermined address in said memory for said status.

12. The system of claim 11 further wherein said graphics driver polling said second predetermined address finds said updated status indicating that said event has occurred and begins processing for delivery a next instruction to said graphics device.

* * * * *

UNITED STATES PATENT AND TRADEMARK OFFICE
CERTIFICATE OF CORRECTION

PATENT NO. : 6,025,855
DATED : February 15, 2000
INVENTOR(S) : Meinerth et al.

It is certified that error appears in the above-identified patent and that said Letters Patent is hereby corrected as shown below:

Column 8,
Line 64, delete "the steps of:"

Column 9,
Line 1, after "accessible to" delete -- a --.
Line 5, delete "data" and insert -- device --.

Signed and Sealed this

Twenty-fourth Day of July, 2001

Attest:

NICHOLAS P. GODICI
Attesting Officer *Acting Director of the United States Patent and Trademark Office*